W. B. JONES.
KITCHEN IMPLEMENT.
APPLICATION FILED AUG. 16, 1919.
1,332,260.
Patented Mar. 2, 1920.
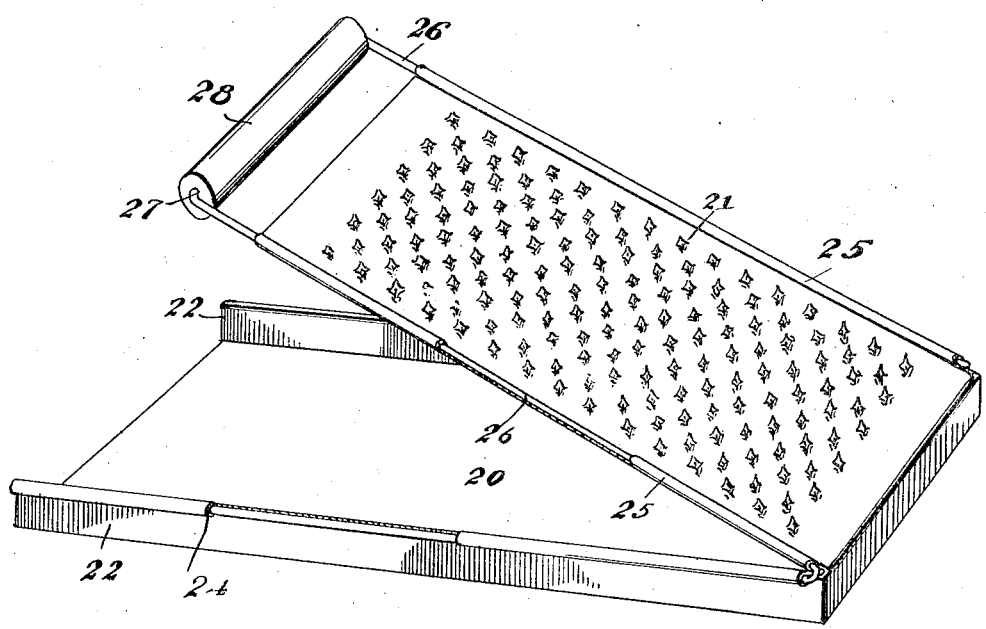
WITNESS:
R. A. Thomas.
INVENTOR.
BY W. B. Jones
Victor J. Evans
ATTORNEY.

UNITED STATES PATENT OFFICE.

WILLIAM B. JONES, OF VAUGHAN, MISSISSIPPI.

KITCHEN IMPLEMENT.

1,332,260.  Specification of Letters Patent.  Patented Mar. 2, 1920.

Application filed August 16, 1919. Serial No. 318,024.

*To all whom it may concern:*

Be it known that I, WILLIAM B. JONES, a citizen of the United States, residing at Vaughan, in the county of Yazoo and State of Mississippi, have invented new and useful Improvements in Kitchen Implements, of which the following is a specification.

This invention comprehends the provision of a combined grater and receptacle, the latter being disposed with relation to the former to receive the material as it passes through the openings in the grater.

The invention has for one of its objects, a stamping from a single piece of material, the combined grater and receptacle, with the grater extended from one end of the receptacle at an inclination above the latter, together with means for connecting and bracing said parts.

The nature and advantages of the invention will be better understood when the detail description is taken in connection with the accompanying drawings; the invention residing in the construction, combination and arrangement of parts as claimed.

The figure is a perspective view of the invention.

The device herein shown comprises a receptacle 20 and a grater 21, both of which are formed from a single blank of material, the grater 21 being disposed above and at an inclination with respect to the receptacle 20. In the specific embodiment of the invention the edges of the side walls 22 of the receptacle terminate to provide loops 24, which in reality, form a continuation of the loops 25 provided by the opposite longitudinal edges of the grater. A substantially V-shaped reinforcing element is arranged at each side of the device, the said reinforcing element being formed from a single piece of wire, and connected at one end by the transverse member 27 to support the handle 28. The V-shaped elements 26 are arranged in the loops 24 and 25 respectively, and serve to brace and reinforce the receptacle and grater. Manifestly, I provide an article of the character disclosed, which can be cheaply manufactured and conveniently handled for the purposes intended. The gratings or the material which passes through the opening in the grater is deposited within the receptacle and when the latter has become filled, or when it is desired to use the gratings or material within the receptacle, the structure in its entirety is tilted in the proper direction to permit the contents of the receptacle to pass therefrom to the open end.

While I have shown and described several forms of the invention, I desire to have it understood that I do not limit myself in this connection, and that such changes may be resorted to when desired as fall within the scope of what is claimed.

Having thus described my invention what is claimed as new is:

As a new article of manufacture, a combined receptacle and grater formed from a single piece of material, said grater being extended from one end of the receptacle, above the latter and at an inclination thereto, the opposite edges of said grater and receptacle terminating to provide continuous loops, and substantially V-shaped elements formed from a single length of wire having limbs arranged within said loops for connecting and bracing said receptacle and grater.

In testimony whereof I affix my signature.

WILLIAM B. JONES.